Figure 1:
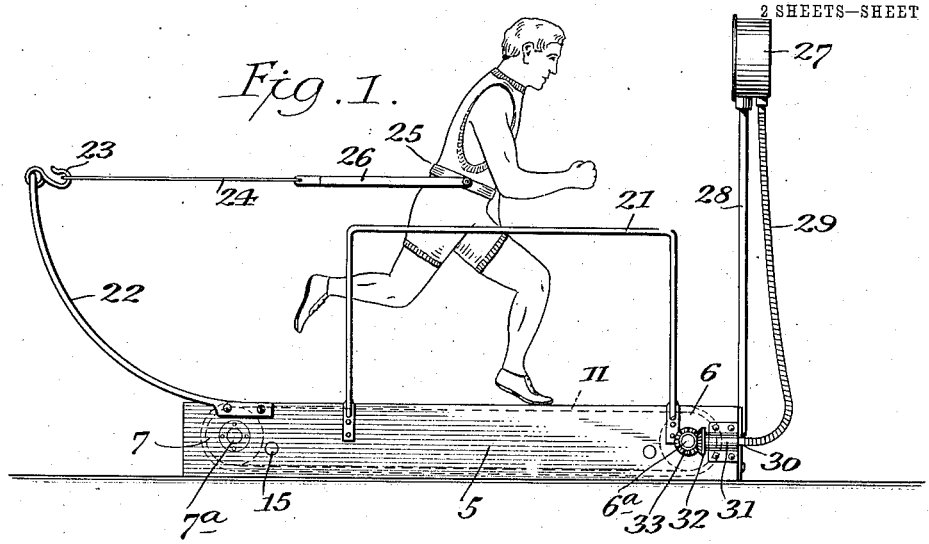

T. R. BARRETT.
APPARATUS FOR ATHLETIC AND THEATRICAL PURPOSES.
APPLICATION FILED FEB. 28, 1911.

1,016,729.

Patented Feb. 6, 1912.

2 SHEETS—SHEET 1.

WITNESSES
A. R. Appleman
J. F. Mothershead

INVENTOR
Timothy R. Barrett,
BY Griffins Bernhard
ATTORNEYS

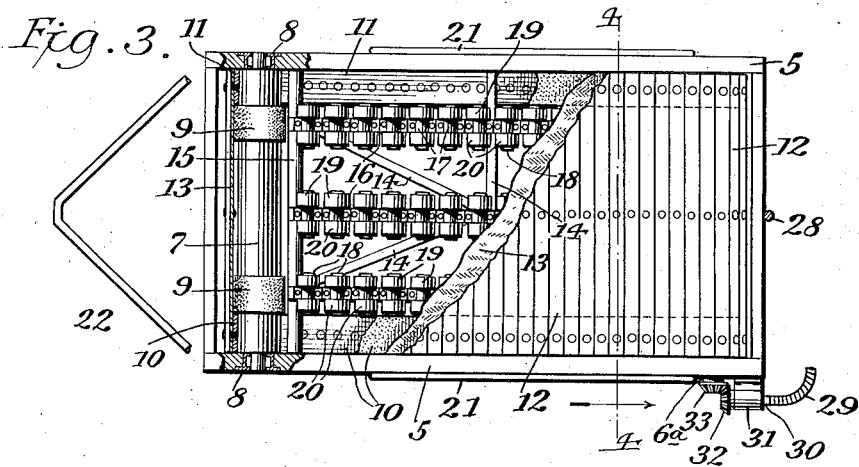
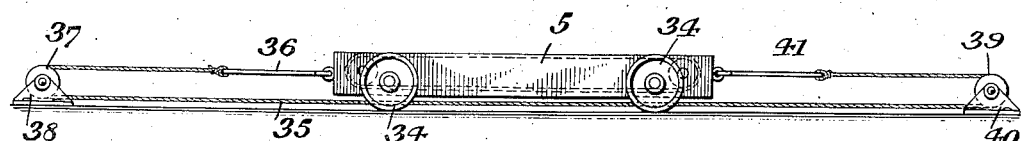

UNITED STATES PATENT OFFICE.

TIMOTHY R. BARRETT, OF BORDENTOWN, NEW JERSEY.

APPARATUS FOR ATHLETIC AND THEATRICAL PURPOSES.

1,016,729.  Specification of Letters Patent.  Patented Feb. 6, 1912.

Application filed February 28, 1911. Serial No. 611,495.

*To all whom it may concern:*

Be it known that I, TIMOTHY R. BARRETT, a citizen of the United States, residing in the city of Bordentown, county of Burlington, and State of New Jersey, have invented a certain new and useful Apparatus for Athletic and Theatrical Purposes, of which the following is a specification.

This invention is an apparatus adapted to be used for athletic or gymnastic purposes and, also, for theatrical or amusement purposes.

An apparatus embodying the invention comprises an endless path composed of slats supported for movement upon suitable devices. Devices of this general character are known under various titles, the most common designation being a "tread mill", but prior structures have been, and are now, objectionable for various reasons, chief among which are, first, the noise of the endless path when set in motion; second, the slow speed at which the path travels when a runner or pedestrian operates thereon; and, third, the spacing of the slats to such an extent that the foot of the runner or pedestrian is liable to be caught and injured between them.

My invention obviates the foregoing, and other, objections inherent in apparatus of the tread mill type, whereby I am enabled to produce an easy running and practically noiseless path upon which an athlete, pedestrian or other performer is able to walk or run with ease and perfect safety.

The apparatus embodies an endless path mounted for movement upon a plurality of series of supporting rollers, the latter being preferably, although not essentially, of the ball bearing type, whereby any tendency of the endless path to sag under the weight of the performer is precluded.

The endless path is composed, in a practical embodiment of the invention, of a plurality of endless flexible belts, slats attached to said belts and grouped closely together, a plurality of barrels over which the belts are adapted to run, and means for deadening the noise when the path is in motion. Said means are embodied in felt coverings for the barrels, and a fabric layer intermediate the slats and the belts, said felt coverings operating, also, as guides for the endless belts so as to insure the endless path running properly upon the barrels.

Other features of novelty and the advantages thereof will appear in the course of the annexed description taken in connection with the drawings.

In the accompanying drawings, I have illustrated different practical embodiments of the invention, but the construction shown therein are to be understood as illustrative, only, and not as defining the limits of the invention.

Figure 2:
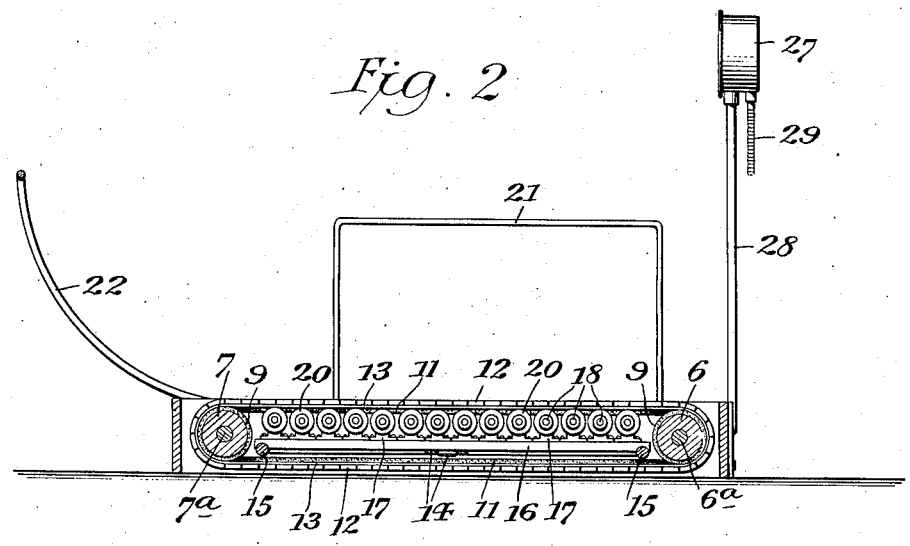

Figure 1 is a side elevation of the apparatus adapted for theatrical or gymnastic work, showing a runner performing thereon. Fig. 2 is a vertical longitudinal section through the apparatus. Fig. 3 is a plan view partly broken away and showing certain devices in horizontal section. Fig. 4 is a vertical cross section on the line 4—4 of Fig. 3 looking in the direction of the arrow. Fig. 5 is a side elevation of another embodiment of the invention, illustrating the apparatus adapted for use in connection with certain other devices for theatrical or amusement purposes.

In carrying the invention into practice the working parts are supported on a main frame 5. The frame may be either portable, as shown in Fig. 5, or stationary as in Figs. 1 to 4, inclusive. Furthermore, any suitable construction of frame may be employed, the frames herein shown being illustrative, only.

Within the respective end portions of the frame are provided barrels 6, 7, having shafts, $6^a$, $7^a$, respectively, said shafts being mounted for rotation freely in suitable boxes or bearings 8 provided in the side members of the frame, substantially as shown in Fig. 3. The barrels are of any suitable or preferred construction; as shown, said barrels consist of cylinders, either wood or metal, but it is evident other means for supporting the endless path may be substituted for the particular form of barrels herein disclosed.

The barrels are provided with coverings, 9, composed of felt or other appropriate noise deadening material. Preferably, two felt covers 9 are provided on each barrel, as shown in Fig. 3.

The endless path of the apparatus consists of endless flexible belts 10, 11, a series of slats 12, and an apron 13 composed of fabric or other noise deadening material. The apron is positioned intermediate the slats and the endless belts, said apron being equal in width to the length of the slats, and the length of said apron being equal to the length of endless belts 10, 11. The belts are composed of leather, or rubber fabric, or any other flexible material, and they are arranged to have the desired frictional engagement with the barrels 6, 7. The fabric apron 13 is laid or positioned directly upon belts 10, 11, and slats 12 are laid next to said fabric apron, these several parts being attached rigidly together by any suitable means, such as rivets or bolts which pass through the belts, the apron and the slats, all as clearly shown in Fig. 3.

The coverings 9 on barrels 6, 7 are positioned within the side rails of frame 5, and between the respective coverings 9 and the side rails of the frame are positioned the endless belts 10, 11. The coverings 9 serve, in a measure, to guide the endless belts 10, 11 in the movement of the endless path, whereby the path is caused to run straight around the barrels for the reason that the endless belts 10, 11 cannot become displaced upon the barrels. The employment of the fabric apron, and the engagement of said apron with the felt coverings of the barrels, operates to deaden the noise of the path when it is in operation. This noise deadening feature of the path is a very important one, for the reason that it overcomes a most serious objection to all forms of apparatus of this type with which I am familiar. The frame is braced internally by suitable bars or rods, such as the cross rods and the straight bar, 14, but the particular form of braces may be varied as desired; in fact the braces may be employed or omitted as deemed necessary.

15 designates a plurality of transverse rods secured to the side rails of the frame, preferably near the barrels 6, 7. These cross rods support a plurality of longitudinal bars 16, preferably 3 in number, as shown in Figs. 3 and 4. The bars are preferably composed of channeled iron, and they are attached rigidly to cross rods 15, whereby the series of channeled bars are supported rigidly between the sides and ends of the frame, said channeled bars being positioned intermediate barrels 6, 7 and the upper and lower runs of the endless path. I may dispense with the middle channel bar, but it is preferred to employ three or more of the channeled bars in order that the rollers, presently described as being mounted upon channeled bars, will operate to effectively preclude any tendency to sag of the upper run or lead of the endless path.

Each channeled bar supports or carries a series of brackets 17, said brackets being grouped quite closely together and the series thereof extending substantially the full length of the bar, see Figs. 2 and 3. The brackets support short transverse axles 18, and on these axles are carrying wheels or rollers 19, 20. The rollers are positioned on the respective ends of the axle and on the opposite side of the bracket, so that the rollers are spaced apart for the purpose of supporting the upper lead of the endless path. It will be noted that each bar 16 supports two series of rollers 19, 20; that there are six rollers across the width of the machine, and that there are six rows of rollers lengthwise of the machine. The rollers are so arranged that they engage with the under side of the endless path in a manner to support the upper lead or run thereof for practically its length and width, whereby the weight of the pedestrian or performer imposed upon the endless path will not have a tendency to cause sagging of said path.

The rollers turn freely on the axles, and to this end I may, and preferably do, employ ball bearings for said rollers in order to secure greatest freedom of rotation, thereby contributing to the free operation or movement of the endless path. This easy running of the path is an important feature of a gymnasium or theatrical apparatus, designed to be set in motion by the efforts of a runner or pedestrian upon the path, but in ordinary apparatus of this type the endless path is not capable of free and easy movement. The path is not only noiseless in its action, but it is movable by slight effort on the part of the performer, and is so supported throughout its length and width that it cannot sag. Furthermore, the slats 12 are positioned rather closely together so that they will form a practically continuous surface on the endless path, thus precluding the foot of the operator from being caught and injured in the spaces between the slats.

The apparatus shown in Figs. 1 to 4, inclusive, is adapted to rest on the floor of a gymnasium or in any other place for the purpose of affording the runners a means for taking exercise. As shown, the apparatus is provided with hand rails 21 attached to the respective sides of the frame, and at one end of said frame is an upstanding bail 22. To this bail is loosely connected a hook 23, to which is attached a strap 24, of a waist belt 25, adapted to be applied to the person of the performer. An elastic strap 26 is positioned between the strap 24 and the waist belt, so as to give to the movement of the runner. A speedometer 27, of any suitable type, is supported on a post 28 attached to the frame, so that the speedometer is in the full view of the performer. The operating parts of the speedometer are driven by the flexible shaft 29, attached to a short shaft 30, mounted in a bracket 31 of the frame. Shaft 30 is provided with a bevel gear 32, which meshes with a similar bevel gear 33, attached to the shaft 6ª of barrel 6, whereby the rotation of the barrel by the movement of the endless path will impart motion to the flexible shaft so as to operate the speedometer.

In Fig. 5, of the drawings, there is shown a portable form of the apparatus especially adapted for theatrical and amusement purposes, such as in the "apparatus for producing illusory dramatic effects" disclosed in my Patent No. 976,976, Nov. 29, 1910. This form of apparatus is provided with suitable carrying wheels 34, casters or rollers, whereby the apparatus is adapted for movement upon a stage floor. The frame 5 carries an endless path constructed as hereinbefore described. In connection with the portable apparatus there is employed means for imparting movement to said apparatus in a forward and backward direction. As shown, said means consists of a looped cable, or its equivalent 35, one end of which is attached to a bail 36, connected to one end portion of frame 5. The cable extends around a direction pulley 37, mounted in a bracket 38, and from this pulley the cable extends below the apparatus to and around a direction pulley 39, supported in a bracket 40. The cable is fastened at its other end to a bail 41, attached to the opposite end of frame 5 from bail 36. The direction pulleys 37, 39 are positioned at the opposite limits of the travel of the apparatus when moved in one direction or the other, and the looped cable 35 is adapted to haul the portable apparatus toward pulley 37, or it may be operated to impart movement to said portable apparatus toward pulley 39. Any suitable means may be employed for operating the cable so as to impart the movement to the portable apparatus, and if desired, means may be associated with one of the direction pulleys for operating the cable. The portable apparatus and its operating means are employed in conjunction with a foreground curtain, a background curtain and a simulated car or other vehicle, substantially as disclosed in my prior patent. By proper operation of the apparatus, the portable device may be caused to gain upon, or to recede from, the simulated car, or other vehicle, so as to give the illusion of a runner failing to catch the car which he is chasing. It is evident that the cable may impart movement to the tread mill apparatus so as to make it approach the rear of the car, thus conveying the impression that the runner is gaining upon the car, but at other times the cable may be operated so as to move the tread mill apparatus away from the car, thereby giving a contrary effect.

Having thus fully described the invention, what I claim as new, and desire to secure by Letters Patent is:—

1. In an apparatus of the class described, a frame, path-supporting barrels rotatable in said frame, a noise-deadening covering for said barrels, and an endless path contacting with said noise-deadening coverings of the barrels.

2. In an apparatus of the class described, a frame, a plurality of barrels mounted therein, a noise-deadening covering for each barrel, an endless path supported by said barrels and contacting with said noise-deadening coverings, and means separate from the barrels and positioned between them for supporting the upper lead of said endless path against sagging.

3. In an apparatus of the class described, a main frame, rotatable barrels supported therein, jackets composed of noise-deadening material secured on said barrels and spaced relative to each other, flexible belts engaging frictionally with the barrels, said belts being retained and guided by edgewise contact with said jackets, an endless apron attached to said belts, and slats fastened to said apron.

4. In an apparatus of the class described, an endless path comprising a plurality of belts, an apron composed of noise-deadening material, and slats attached to the belts and the apron, combined with a frame, and a plurality of barrels for supporting the endless path.

5. In an apparatus of the class described, a frame, a plurality of barrels therein, flexible belts engaging frictionally with said barrels, an endless apron attached to said belts, said apron being composed of noise-deadening material, slats attached to said apron and the flexible belts, and a plurality of series of rollers supported between the leads of the endless apron, said rollers contacting frictionally with the upper lead of said endless apron and positioned between the flexible belts.

6. In an apparatus of the class described, a frame, barrels supported therein, noise deadening coverings for said barrels, an endless path running around said barrels and in contact with said coverings, and rollers contacting with said endless path.

7. In an apparatus of the class described, a frame, barrels supported therein, noise deadening coverings for said barrels, an endless path provided with a noise deadening fabric to which slats are attached, said path running around the barrels, and rollers contacting with said path.

8. In an apparatus of the class described, an endless path provided with endless belts, transverse slats attached thereto, and a noise deadening fabric intermediate the belts and the slats, a frame, barrels supported therein, noise deadening coverings on said barrels, said coverings coöperating with said belts in guiding the path, and rollers contacting with said path.

In testimony whereof I have signed my name to this specification in the presence of two subscribing witnesses.

TIMOTHY R. BARRETT.

Witnesses:
H. T. BERNHERD,
J. F. MOTHERSHEAD.